United States Patent Office 3,259,907
Patented July 5, 1966

3,259,907
MONO(ALKYLTHIOALKYL) ESTERS OF 3,6-ENDOXOHEXAHYDROPHTHALIC ACID
Herbert Q. Smith, Trenton, N.J., and Thomas E. Deger, Ambler, Pa., assignors to Pennsalt Chemicals Corporation, Philadelphia, Pa., a corporation of Pennsylvania
No Drawing. Filed Nov. 4, 1963, Ser. No. 321,279
6 Claims. (Cl. 260—347.2)

This invention deals with novel compounds which affect plant growth and which are particularly useful as selective herbicides. In particular, the invention relates to mono(alkylthioalkyl) esters of 3,6-endoxohexahydrophthalic acids and salts thereof, the acids having the structure

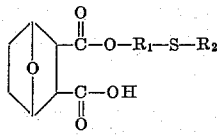

where $R_1$ is an alkylene radical containing from 1 to 5 carbon atoms and $R_2$ is an alkyl radical containing from 1 to 5 carbon atoms. The invention is concerned also with the process of making and using these compounds.

The compound 3,6-endoxohexahydrophthalic acid is a known herbicide commonly called endothall. Endothall in the form of its disodium salt is widely used and is particularly useful as a defoliant and as a pre-emergent herbicide. In the latter application, however, it has been found that certain soils contain many factors which degrade disodium endothall very rapidly so that in some cases it loses its effectiveness rather quickly. Although esters of endothall are generally much less herbicidally active than endothall itself, it has now been found that the specific ester defined by the above structure not only has surprisingly high herbicidal activity, but also is resistant to degradation in the soil.

The compounds of the invention are prepared readily by reacting 3,6-endoxohexahydrophthalic anhydride with the appropriate 2-(alkylthio)alkanol, the reaction generally being carried out at reflux in a solvent such as an aromatic hydrocarbon (e.g. benzene, toluene, etc.) or other inert solvent. After the reaction is completed the solid product which forms is isolated from the reaction mass by removal of the solvent and purified, generally by crystallization from an appropriate solvent. It will be understood that the above-described process yields the free acid. As indicated, however, salts of the acid are also an embodiment of the invention and such salts are readily obtained by well known metathesis reactions with an appropriate reactant. Thus, for example, to obtain the ammonium, substituted ammonium, alkali and alkaline earth metal salts, the free acid is merely reacted with the appropriate reagent, e.g. $NH_4OH$, $CH_3NH_2$, $(C_2H_5)_2NH$, $(CH_3)_3N$, $(n-C_4H_9)_3N$, NaOH, KOH, $CaCl_2$, $MgCl_2$, $BaCl_2$, etc. and the salt recovered in the usual manner of work-up. Particularly useful and preferred embodiments of this invention are the amine salts and preferably di-lower alkyl-long chain amine salts, e.g. salts derived from amines of structure

where $R_3$ and $R_4$ are alkyl containing from one to four carbon atoms and $R_5$ is alkyl containing from twelve to eighteen carbon atoms. These amines may be derived from the well known aliphatic hydrocarbon amines obtained by reductive amination of the acids of animal fats and vegetable oils, particularly tallow and coconut acids, which have predominantly 12 to 18 carbon atoms in the chain. Of particular value are coconut oil amines (predominantly 12 to 14 carbon atoms) which have been converted to tertiary amines by alkylation. Other tertiary amines within the above structural configuration are also operable in this invention and such amines may be obtained by the amination and subsequent alkylation of oleic, linoleic, tallow and soya acids. Alternatively, these tertiary amines may be obtained by conversion of the acids to an amide with a di-lower alkyl-secondary amine followed by reduction of the carbonyl group. Specific amines which may be used to form the salts useful in this invention include N,N-dimethyllauryl amine, N,N-diethylmyristal amine, N,N-dipropylstearyl amine, and the like. However, because of availability, and cost, mixtures of amines will preferably be used such as the mixtures found with N,N-dimethylcocoamine, N,N-dimethylsoyaamine, etc. The methods of making these amines are well known, the various processes being disclosed in the book by Astle entitled "Industrial Organic Nitrogen Compounds" (Reinhold, 1961). Tertiary amines also useful in this invention will include those made from oxo-alcohols which compounds will have large amounts of branching in the long chain entity. Thus, for example, the alkyl tridecylamines derived from tridecyl alcohol made by the oxo process are particularly useful in this invention. The oxo-alcohol is converted to the amine by reaction with a di-lower alkyl-amine (e.g. dimethylamine) under conditions of heat and pressure in the pressure of alumina as a catalyst as described in U.S. 2,043,965 whereby the dialkyl tridecylamine is obtained.

The compounds of the invention are white crystalline solids which melt sharply. The acid compound is insoluble in water, but is soluble in many common organic solvents such as acetone, ethanol, etc. The alkali metal, ammonium and amine salts of the compounds of the invention are water soluble, although the alkaline earth metal salts (e.g. calcium, barium, etc.) are water insoluble, but may be dispersed in water with appropriate surfactants.

The alkylthioalkanol which will be used to react with the 3,6-endoxohexahydrophthalic anhydride will include such compounds as 2-(methylthio)ethanol, 2-(ethylthio)-ethanol, 2-(propylthio)ethanol, 2-(ethylthio)propanol, 3-(ethylthio)propanol, 2-(butylthio)ethanol, 4-(ethylthio)-butanol, ethylthiomethanol, methylthioethanol, isopropylthioethanol, ethylthioisopropanol, butylthioisopropanol, etc. The compounds of the invention are named as mono(alkylthioalkyl) 3,6-endoxohexahydrophthalate esters; e.g. mono(3-ethyl)thiopropyl 3,6-endoxohexahydrophthalate which has the structure

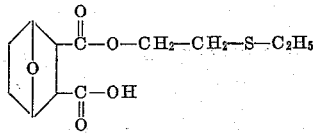

The compounds of the invention may be used as pre-emergent and post-emergent herbicides as well as desiccants and defoliants and will be applied and formulated in the usual manner. As indicated, the compounds are particularly effective as pre-emergent herbicides for control of weeds and to kill undesired vegetation. The compounds may be used at effective concentrations which will generally range from about 3 lbs. to 100 lbs. per acre. Preferably the concentrations used will be in the range of 3 to 30 lbs. per acre and such concentrations may be used without damaging or destroying the crop. Lower rates can be used, of course, to retard weed growth. Compositions may be formulated depending upon the compound's water solubility as dispersions in water or as water solutions with or without suitable wetting agents which will aid in penetration of plant and soil surfaces. Compounds such as the water insoluble alkaline earth metal salts may be made more compatible with water by the addition of water soluble solvents such as ethylene glycol, diacetone alcohol, methanol, ethanol, etc. Suitable water dispersion concentrates of low water soluble compounds may be prepared by ball milling the solid material in water with a suitable wetting and suspending agent such as lignin sulfonate, bentonite, etc. Alternatively, solutions of the agents in organic solvents may be employed for use under field conditions.

Compositions may also be prepared as emulsion concentrates for dilution with water for field application. These concentrates may be prepared by the use of suitable solvents such as xylene, isophorone, heavy aromatic naphtha, methylated naphthalene, and the like, with the addition of suitable emulsifying agents which are usually blends of various compounds having the proper ratios of oil and water solubility properties and which are stable in the presence of the compound.

Wettable powders may be prepared by direct grinding of the dry compounds with a blend of a suitable dispersing agent such as attapulgite, bentonite, kieselguhr, etc. It is desirable to grind such a blend in a hammer mill so that 99% will pass through a 325-mesh screen. Wettable powders may also be prepared by absorbing a solution of the compound in a solvent such as xylene or acetone on a powdered or granular clay such as attapulgite or diatomaceous earth. All wettable powder preparations should contain a dispersing agent such as a lignin sulfonate and a wetting agent such as an alkylaryl polyether glycol.

The compounds of the invention may also be used to formulate granules of 5 to 20% concentration of active herbicidal ingredient. The user may make application by use of a granular applicator rather than a duster or sprayer and known methods in commercial use are applicable for the preparation of granular formulations.

In general, the formulated compositions will contain from about 1% to about 90% by weight of active agent.

Examples of suitable formulations are as follows.

I. Aqueous solution:                 Parts by weight
  A. Mono(2 - ethylthioethyl) - 3,6 - endoxo-
      hexahydrophthalate _____ 43.0
      $NH_4OH$ (28.3% $NH_3$) _____ 18.0
      Water _____ 39.0
  B. Mono(2 - ethylthiomethyl) - 3,6 - endoxo-
      hexahydrophthalate _____ 22.0
      KOH (flake) _____ 5.5
      Water _____ 72.5
  C. Mono(4 - butylthioethyl) - 3,6 - endoxo-
      hexahydrophthalate _____ 36.0
      Dimethyltridecylamine _____ 43.5
      Water _____ 20.5
  D. Mono(5 - pentylthiopentyl) - 3,6 - endoxo-
      hexahydrophthalate _____ 10.0
      Dimethylcocoamine _____ 8.3
      Water _____ 81.7

II. Emulsion concentrate:
  Mono(2 - ethylthioethyl) - 3,6 - endoxohexa-
    hydrophthalate _____ 10.0
  Xylene _____ 89.0
  Polyether alcohol surfactant ("Triton"
    X–161) _____ 1.0

The use of the compounds and their formulation in pre-emergent weed control applications on various crops will be carried out in the usual fashion. Pre-emergent weed control involves the application of the chemical to the soil some time prior to the emergence of the crop. Application can be conveniently made at the same time as the seeding operation and most commonly involves the use of a sprayer attachment to the planter which applies the diluted chemical on the soil surface immediately after covering the seed. Only a band of the seed row may be treated with the herbicide or the whole area may be treated on a broadcast basis. The chemical may or may not be mixed with the first one or two inches of soil at the time of this application, using a suitable Rototiller type tool.

The pre-emergent herbicides as employed in this invention possess the necessary properties to be effective in field use. Ideally, it should be possible to place a chemical on the soil surface in the zone of germinating weed seeds which are usually above the zone in which the crop plant has been placed. Small weed seeds usually emerge from only the upper inch of soil. However, it is impossible under practical conditions to maintain a separation of the chemical and it is, therefore, necessary for the herbicide to be of a selective type which will control as many undesirable weeds as possible without significant injury to the crop. This requires fairly unique and highly specific properties in the chemical since many of the crop plants are related botanically to weed crops occurring in the same field. The compounds of this invention have these highly selective properties. Furthermore, and particularly important, is the fact that the compounds of this invention are resistant to degradation by various factors which are present in the soil environment and which will destroy or mitigate herbicidal activity; viz: absorption of the active agent by the clay ingredient in the soil, variations in pH values which might cause hydrolytic degradation, microbiological degradation, ultraviolet radiation which degrades the agent, loss by volatilization, etc. The herbicides of this invention also have a wide spectrum of weed control, which is desirable because most crops can be infested with many species of both grasses and broad leaf weeds. The pre-emergent herbicides of this invention are adapted for use on specific crop plants and show a high degree of tolerance to many varieties of crops. This tolerance is shown on all types of soils and under various environmental conditions which change the response of the crop to a chemical.

The compositions may also be used in post-emergent applications for weed control where the emerged crop is sufficiently resistant. These applications may be made particularly in the period between emergence and the first cultivation of the crop, but treatments may also be made at later times such as the so-called lay-by treatment after the last possible cultivation to inhibit weed growth up to the time of harvest.

The compounds of the invention and their formulations may also be used as harvest aid chemicals which will either desiccate or defoliate green leaves on susceptible crops and also desiccate any weeds which may be present in order to facilitate the mechanical harvesting with a combine in the case of seed crops. The compounds may also be used in higher doses than normally used for crop application in order to sterilize the soil of all plant growth. Seasonal control of weeds in areas such as industrial sites, roadsides, etc. may be accomplished in this manner.

EXAMPLES.—PREPARATION OF COMPOUNDS

*Example 1*

To a stirred solution of 45.4 g. (0.27 mole) of 3,6-endoxohexahydrophthalic anhydride in 150 ml. benzene at 80° C. is added dropwise 29.8 g. (0.28 mole) of 2-(ethylthio)ethanol over a one-half hour period. After the addition is complete, the solution is stirred at reflux for 3 hours. There is then filtered from the reaction 5.4 g. of a white solid, M.P. 108–110° C., which is unreacted 3,6-endoxohexahydrophthalic anhydride. The filtrate, on removal of the solvent by distillation, gives 68.9 g. (93% conversion) of a crude white solid which is recrystallized from 200 ml. of 2:1 acetone-hexane to give 48.6 g. (55% conversion, 75% yield) of pure mono- (2 - ethylthioethyl)-3,6-endoxohexahydrophthalate. The product melts at 87–88.5° C. and has the structure

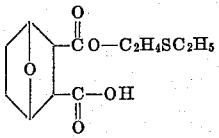

Calc. for $C_{12}H_{18}O_5S$: C, 52.45%; H, 6.55%; S, 11.65%. Found: C, 52.40%; H, 6.53%; S, 11.62%.

Example 2

Instead of using 2-(ethylthio)ethanol in the above example, 2-(methylthio)ethanol may be used with essentially the same results to yield a white crystalline product.

Example 3

When 2-(butylthio)ethanol is used instead of 2-(ethylthio)ethanol as in Example 1, the product obtained is mono(2-butylthioethyl)-3,6-endoxohexahydrophthalate.

Example 4

Instead of using 2-(ethylthio)ethanol in Example 1, 2-(ethylthio)propanol is employed in order to obtain 2-(ethylthiopropyl)-3,6-endoxohexahydrophthalate.

Example 5

The mono(2-ethylthio)-3,6-endoxohexahydrophthalate of Example 1 is converted to its sodium salt by adding 68.5 g. of the ester to a solution of 10 g. of NaOH in 200 ml. of water. Evaporation of the water under reduced pressure leaves the sodium salt as a white solid. It is soluble in water and insoluble in most organic solvents.

Example 6

The ammonium salt is obtained in a manner similar to that employed for the sodium salt except that 4.3 g. of ammonia per 100 ml. of water is used per 68.5 g. of the mono(2 - ethylthioethyl)-3,6-endoxohexahydrophthalate. Removal of the water in vacuo leaves the ammonium salt as a white solid which is soluble in water, but insoluble in most organic solvents.

Example 7

One mole of mono(2-ethylthioethyl)-3,6-endoxohexahydrophthalate in aqueous media is treated with one mole of dimethyltridecylamine to prepare an aqueous solution of the amine salt. Removal of the water under reduced pressure leaves the dimethyltridecylamine salt as a yellow-brown, water-soluble solid.

Example 8

As in Example 7, an aqueous solution of the dimethylcocoamine salt of mono(2 - ethylthioethyl) - 3,6 - endoxohexahydrophthalate is prepared. Evaporation of the solvent in vacuo leaves the dimethylcocoamine salt as a yellow-brown solid which is soluble in water.

Example 9

*Pre-emergent herbicidal activity.*—Seeds of weeds and crops were planted about one-half inch from the surface in soil contained in greenhouse flats and an emulsion of mono(2 - ethylthioethyl) - 3,6 - endoxohexahydro - o - phthalate in water was spray-applied to the soil surface at rates of 5 and 10 lbs. per acre immediately after seeding. The aqueous emulsion was prepared by emulsifying a 10% by weight solution of the agent in xylene with water containing a nonionic polyalkylene oxide surfactant ("Triton" X–161). The sprayed flats were retained under greenhouse conditions and observed periodically. After three weeks the results observed are shown in Table I.

TABLE I.—PRE-EMERGENT HERBICIDAL ACTIVITY OF MONO(2-ETHYLTHIOETHYL)-3,6-ENDOXOHEXAHYDROPHTHALATE

|  | Percent of Weeds Killed Rate per Acre | |
|---|---|---|
|  | 5 lbs. | 10 lbs. |
| Weeds: |  |  |
| Foxtail | 92 | 97 |
| Crabgrass | 75 | 75 |
| Wild Oats | 70 | 50 |
| Lambsquarters | 0 | 0 |
|  | Percent of Crops Emerged | |
| Crops: |  |  |
| Cotton | 100 | 78 |
| Peas | 90 | 55 |
| Soybeans | 100 | 77 |
| Sugar Beets | 99 | 100 |
| Flax | 0 | 0 |

Example 10

*Post-emergent herbicidal activity.*—One month old plants in greenhouse flats were sprayed at a rate of 10 lbs. per acre with an aqueous emulsion of mono(2-ethylthioethyl) - 3,6 - endoxohexahydrophthalate prepared by emulsifying in water a 10% by weight solution of the agent in diacetone alcohol using a polyalkylene oxide surfactant ("Triton" X–161). Table II indicates the results obtained.

TABLE II.—POST-EMERGENT HERBICIDAL ACTIVITY OF MONO(2 - ETHYLTHIOETHYL)-3,6-ENDOXOHEXAHYDROPHTHALATE

| Plant. | Percent desiccation |
|---|---|
| Foxtail | 60 |
| Lambsquarters | 30 |
| Cotton | 70 |
| Peas | 100 |
| Flax | 100 |
| Soybeans | 70 |
| Wild oats | 0 |
| Sugar beets | 0 |

In the above test, good defoliation activity was shown by a 90% drop of leaves on cotton plants and by a 70% drop of soybean plants.

Example 11

The post-emergent test of Example 9 was repeated using an aqueous emulsion made from a 10% xylene solution instead of the diacetone alcohol solution. The emulsion was applied at 5 pounds per acre with the following results.

TABLE III.—EFFECT OF CONTACT APPLICATION OF MONO(2-ETHYLTHIOETHYL) - 3,6 - ENDOXOHEXAHYDROPHTHALATE APPLIED AT 5 LBS./ACRE

| Plant: | Plant desiccation |
|---|---|
| Foxtail | 80 |
| Crabgrass | 70 |
| Lambsquarters | 15 |
| Wild oats | 10 |
| Sugar beets | 15 |
| Cotton | 100 |
| Peas | 95 |
| Soybeans | 95 |
| Flax | 100 |

When mono(2 - butylthioethyl) - 3,6 - endoxohexahydrophthalate is used in the above test, essentially the same herbicidal effect is obtained.

Example 12

*Resistance to degradation by soil factors.*—A soil mixture known to contain factors which quickly degrade disodium endothall is treated with equivalent amounts of active herbicides and the treated soil allowed to stand for 20 days before planting flax seeds. Seven days after seeding, the root length of the germinated seeds is measured, the smaller root length indicating greater herbicidal activity remaining in the soil. Table IV indicates the data:

TABLE IV.—SOIL DEGRADATION EFFECTS

| Herbicide | Root length of 7-day germinated flax seed planted after 20 days |
|---|---|
| Disodium endothall, mm | 93 |
| Mono(2-ethylthioethyl)-3,6-endoxohexahydrophthalate, mm | 3 |
| Control: Soil treated with disodium endothall immediately prior to seeding, mm | 3 |

In a similar test where the number of emerged plants indicated the herbicidal effect the following data are obtained.

TABLE V.—SOIL DEGRADATION EFFECTS

[10 lbs./acre herbicide applied to soil, soil incubated 20 days and flax seed planted]

Herbicide: Number of flax plants emerged
Disodium endothall _____ 40
Mono(2-ethylthioethyl)-3,6-endoxohexahydrophthalate _____ None
Control: Soil treated with disodium endothall immediately prior to seeding _____ 1

It is clear from the above data that the compounds of this invention are surprisingly much more resistant to soil degradation than the parent endothall from which they are derived.

*Example 13*

The test procedures of Examples 9 and 10 are repeated except that the active agent is an aqueous solution of the dimethyltridecylamine salt of mono(2-ethylthioethyl)-3,6-endoxohexahydrophthalate. The test results are shown in the following table:

TABLE VI.—PRE-EMERGENCE AND POST-EMERGENCE HERBICIDAL EFFECTS OF DIMETHYLTRIDECYLAMINE SALT OF MONO(2-ETHYLTHIOETHYL)-3,6-ENDOXOHEXAHYDROPHTHALATE

| Plant | Percent Kill, lbs. per acre | | | Percent Desiccation, lbs. per acre | | |
|---|---|---|---|---|---|---|
| | 10 | 5 | 2.5 | 10 | 5 | 2.5 |
| Foxtail | 100 | 97 | 97 | 100 | 95 | 98 |
| Crabgrass | 100 | 80 | 80 | | | 15 |
| Amaranthus | 100 | | 100 | 100 | | |
| Lambsquarter | 70 | 35 | 0 | 100 | 90 | 50 |

*Example 14*

The dimethylcocoamine salt of mono(2-ethylthioethyl)-3,6-endoxohexahydrophthalate when applied to cotton, soybeans and flax at a rate of five pounds per acre causes 80%, 80% and 100% defoliation respectively.

*Example 15*

When used as in Example 14, the ammonium and sodium salts at ten pounds per acre both show 60% defoliation on cotton.

We claim:
1. A mono(alkylthioalkyl) ester of a 3,6-endoxohexahydrophthalic acid selected from the group consisting of free acid and salts thereof wherein said alkyl groups contain from 1 to 5 carbon atoms.
2. Mono(2 - ethylthioethyl) - 3,6 - endoxohexahydrophthalate.
3. Mono(2 - butylthioethyl) - 3,6 - endoxohexahydrophthalate.
4. Mono(2 - methylthioethyl)-3,6 - endoxohexahydrophthalate.
5. The dimethyltridecyl amine salt of mono(2-ethylthioethyl)-3,6-endoxohexahydrophthalate.
6. The mono dimethylcocoamine salt of (2-methylthiomethyl)-3,6-endoxohexahydrophthalate.

References Cited by the Examiner
UNITED STATES PATENTS

| | | | |
|---|---|---|---|
| 2,637,645 | 5/1953 | Tischler et al. | 260—347.5 |
| 2,784,199 | 3/1957 | Grogan et al. | 260—326 |
| 3,074,970 | 1/1963 | Harmon et al. | 260—347.2 |
| 3,117,852 | 1/1964 | Dissen | 71—2.5 |
| 3,118,754 | 1/1964 | Nickell | 71—2.5 |
| 3,119,845 | 1/1964 | Jucker et al. | 260—347.2 |

NICHOLAS S. RIZZO, *Primary Examiner.*

JOHN D. RANDOLPH, HENRY R. JILES,
*Assistant Examiners.*